United States Patent
Khanna et al.

(10) Patent No.: US 10,482,469 B2
(45) Date of Patent: Nov. 19, 2019

(54) SYSTEMS AND METHODS FOR PROVIDING INFORMATION FROM MULTIPLE SOURCES

(75) Inventors: Shikha Khanna, Cupertino, CA (US); Nicole Lee Birdsall, San Jose, CA (US)

(73) Assignee: eBay Inc., San Jose, CA (US)

( * ) Notice: Subject to any disclaimer, the term of this patent is extended or adjusted under 35 U.S.C. 154(b) by 611 days.

(21) Appl. No.: 12/776,937

(22) Filed: May 10, 2010

(65) Prior Publication Data
US 2011/0276434 A1    Nov. 10, 2011

(51) Int. Cl.
*G06Q 30/00* (2012.01)
*G06Q 30/06* (2012.01)

(52) U.S. Cl.
CPC ......... *G06Q 30/00* (2013.01); *G06Q 30/0641* (2013.01)

(58) Field of Classification Search
CPC ............... G06Q 30/0633; G06Q 30/06; G06Q 30/0601; G06Q 30/0253; G06Q 30/0222
USPC .............................. 705/26, 27, 37, 26.1, 27.1
See application file for complete search history.

(56) References Cited

U.S. PATENT DOCUMENTS

| | | | |
|---|---|---|---|
| 6,278,996 B1 * | 8/2001 | Richardson et al. | |
| 2002/0099639 A1 * | 7/2002 | Caughey et al. | 705/37 |
| 2003/0204447 A1 * | 10/2003 | Dalzell | G06Q 30/02 235/375 |
| 2009/0112683 A1 * | 4/2009 | Hamilton et al. | 705/10 |

OTHER PUBLICATIONS

Gerald L. Lohse, Peter Spiller, Internet retail store design: How the user interface influences traffic and sales, Journal of Computer-Mediated Communication, vol. 5, Issue 2, Dec. 1, 1999, JCMC522, https://doi.org/10.1111/j.1083-6101.1999.tb00339.x (Year: 1999).*

* cited by examiner

*Primary Examiner* — Jeffrey A. Smith
*Assistant Examiner* — Anand R Loharikar
(74) *Attorney, Agent, or Firm* — Schwegman Lundberg & Woessner, P.A.

(57) ABSTRACT

A method and a system for providing information about a posting from multiple sources are provided. For example, the method may comprise storing a posting that was submitted by a first user in an online publication system. Then, one or more stored inquiries associated with the posting may be retrieved. Finally, a response is selectively retrieved from a response source. The retrieved response may correspond to the stored inquiry and the posting. The response source is at least one of the posting, the online publication system, the first user, and a user account of a second user.

15 Claims, 15 Drawing Sheets

600

MANAGE USER QUESTIONS

CHOOSE WHAT YOU WANT USERS TO SEE:

⦿ SHOW Q&A AND ALLOW USERS TO CONTACT YOU DIRECTLY

○ SHOW Q&A ONLY

○ DON'T SHOW Q&A AND ALLOW USERS TO CONTACT YOU DIRECTLY

○ SHOW Q&A FROM A THIRD PARTY DATABASE

*Figure 6*

Manage buyers' questions

Build a questions and answers (Q&A) page that buyers will see when they click "Ask a question" on your item listing.

Choose what you want buyers to see:

[ Show Q&A only ▾ ]

Buyers will see your Q&A only. Select this option if you don't want to have buyers contact you directly.

Select a topic to review answers

- Item details (1)
- Shipping (4)
- Payment (3)
- Returns (1)
- Other (0)
- All answers (9)

Auto answers + your answers = informed, happy buyers

Auto answers are dynamic answers that we generate based on the information you provided on the item listing. For example, if you specified in your listing for a ruby ring that you offer international shipping to the US, Canada, and Mexico, the auto answer would appear like this:

*Example:* Is international shipping offered?
Yes the seller offers *international shipping*.
This seller ships to the following countries: *US, Canada, Mexico*.
More examples and details Auto answers let buyers get answers fast, and frees you from having to manually answer questions. You can also add your own questions and answers.

Get started by selecting a topic!

[ Submit ]  Cancel

Manage buyers' questions

Build a questions and answers (Q&A) page that buyers will see when they click "Ask a question" on your item listing.

Choose what you want buyers to see: ☐ Show Q&A and allow buyers to contact you directly ●

Select a topic to create answers

- Item details (2)
- Shipping (4)
- Payment (3)
- Returns (1)
- Other (0)
- All answers (10)

Shipping: Review auto answers [ What is this? ]

We've generated a list of frequently asked questions from buyers for you. Once a buyer selects their question, we will show them a dynamically-generated auto answer. These auto answers are based on the details you entered when you listed your item.

Remember: This list of questions will show in the Q&A for all your listings. The answers will be specific to the particular item. Learn more ▼ How do I pay for my purchase?
  This answer will show the payment information you provided when you listed this item.

▼ Can I pay with an eBay coupon, gift card, or gift certificate?
  This answer will show whether or not the buyer can use a coupon, gift card or gift certificate to purchase your item. This answer is based on eBay information.

▼ How do I confirm that my eBay gift card, gift certificate or coupon was applied to my order?
  This answer is based on eBay information on how coupons, gift cards, and gift certificates are applied during checkout.

Payment: Create your own Q&A
[ Add more questions ]

[ Submit ]  Cancel

My Messages: Respond to Question

To: shikha.khanna
From: prodtestbuyercore
Item: Test Title (280318228519)
Subject: Re: Question about shipping for item #280318228519 - Test Title

Q: how much is combined shipping?

Enter your response here 1976 characters left. No HTML.

Tip
Need help calculating shipping cost?
Use the 🖩 Shipping Calculator eBay will send your message to shikha.khanna's My Messages Inbox and email address.

☐ Hide my email address from shikha.khanna.
☐ Send a copy to my email address.
☐ Post this question and response on my listing so all buyers can see it. Once posted, it cant be edited.

[Send]  Clear form

Questions awaiting response (2)

| Question | Action | Received on |
|---|---|---|
| 1. do you offer combined shipping? What the cost?<br>From: shikha.khanna (2) | Respond \| Delete | Mar-01-09 |
| 2. how much is combined shipping?<br>From: shikha.khanna (3) | Respond above \| Delete | Mar-01-09 |

SYSTEMS AND METHODS FOR PROVIDING INFORMATION FROM MULTIPLE SOURCES

TECHNICAL FIELD

The present application relates generally to the technical field of data management and in one specific example, to provide information from multiple sources.

BACKGROUND

In an online publication system, a poster submits a posting to be published for display to users. Examples of postings include items for sale, auctions, classifieds, blog posts, service offerings, show times, invitations to events, and the like. Upon viewing the posting, the users may have questions about the posting. It may not be desirable for the poster to answer each question. In some instances, the question may be directed to information already included in the posting or information that is only available to the online publication system.

BRIEF DESCRIPTION OF THE DRAWINGS

Some embodiments are illustrated by way of example and not limitation in the figures of the accompanying drawings in which:

FIG. 6 is a depiction of an example interface for receiving a setting from a poster.

FIG. 7 is a depiction of an example interface to educate a poster about the inquiry system.

FIG. 8 is a depiction of an example interface for receiving one or more stored inquiries from a poster.

FIG. 9 is a depiction of an example interface displaying stored inquiries and a response source for each stored inquiry.

FIG. 10 is a depiction of an example interface for responding to an inquiry received from a user.

FIG. 11 is a depiction of an example interface displayed to a user to view stored inquiries and responses to the stored inquiries before a transaction.

DETAILED DESCRIPTION

Example methods and systems to provide information from multiple sources are described. In the following description, for purposes of explanation, numerous specific details are set forth in order to provide a thorough understanding of example embodiments. It will be evident, however, to one skilled in the art that the present invention may be practiced without these specific details.

In an online publication system, posters (i.e., users or individuals) submit one or more postings that are viewable by users of the online publication system. Examples of postings include items for sale, auctions, classifieds, blog posts, service offerings, show times, invitations to events, and the like. Upon viewing the postings, the user may want to ask the poster a question about the posting.

The poster, however, may not be able to respond to the question due to the volume of questions received or because the question may relate to the online publication system rather than the poster or the posting itself. In some instances, the user may submit a question that is answerable using information included in the posting.

An inquiry system is used to provide a listing of one or more inquiries that are each selectable by a user. The inquiries are each associated with a stored or generated response that may be particular to the user, the posting, or the poster. When an inquiry is selected, a stored response to the inquiry is determined and displayed to the user. The stored response may be based on the posting itself, on information provided by the seller, on information provided by the online publication system, and/or on information generated from the user's information.

Figure 1:
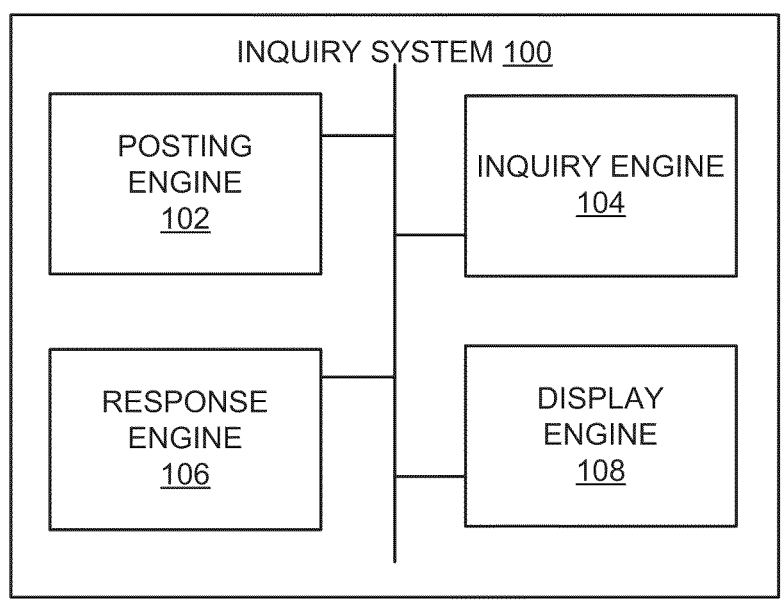
FIG. 1 is a block diagram of an inquiry system for answering inquiries about a posting in an online publication system, according to some embodiments.

FIG. 1 is a block diagram of an inquiry system 100 for answering inquiries about a posting in an online publication system according to some embodiments. The inquiry system 100 is included as part of an online publication system where posters submit postings to be viewed by users within the online publication system. The online publication system may comprise marketplace and/or payment applications as discussed in connection with FIG. 14, below. The inquiry system 100 comprises a posting engine 102, an inquiry engine 104, a response engine 106, and a display engine 108.

The posting engine 102 stores, or has access to, postings submitted by posters in the online publication system. The postings may include auctions, descriptions of items for sale or services offered, event announcements, invitations, classifieds, personal ads, job opportunities, social networking profiles, and the like. The postings may be associated with corresponding metadata such as a posting identifier, a poster identifier, a time at which the posting was submit, an expiration time or time period, or the like.

The inquiry engine 104 stores, or has access to, inquiries corresponding to at least a portion of the postings. The inquiries are predetermined questions about the posting. In some instances, the inquiries comprise frequently-asked questions (FAQs) that are associated with a response received from the online publication system, the poster, or the posting. The inquiry engine 104 may access a record of inquiries previously submitted by users in the online publication system and present at least a portion of those questions to the poster when a posting is submitted. The portion presented to the poster may be selected based on, for example, a threshold number of times the inquiry has been received, a frequency over a predetermined period of time that the inquiry has been received, a change in the frequency that the inquiry has been received, or other factors. In instances where the previous questions are presented to the poster, the poster may select at least a portion of the presented questions and provide an answer to those questions that is stored for later retrieval.

The response engine 106 is to provide a response to the inquiries. The provided response is based on information within the posting, information associated with the poster, and information accessible by the online publication system, including information about the user. The response engine 106 is discussed in greater detail in connection with FIG. 3.

The display engine 108 is to generate and provide user interfaces for the poster and the user to view and interact with the stored inquiries and the stored responses. In some instances, the display engine 108 may provide an interface for receiving a new inquiry from a user about a posting.

Figure 2:
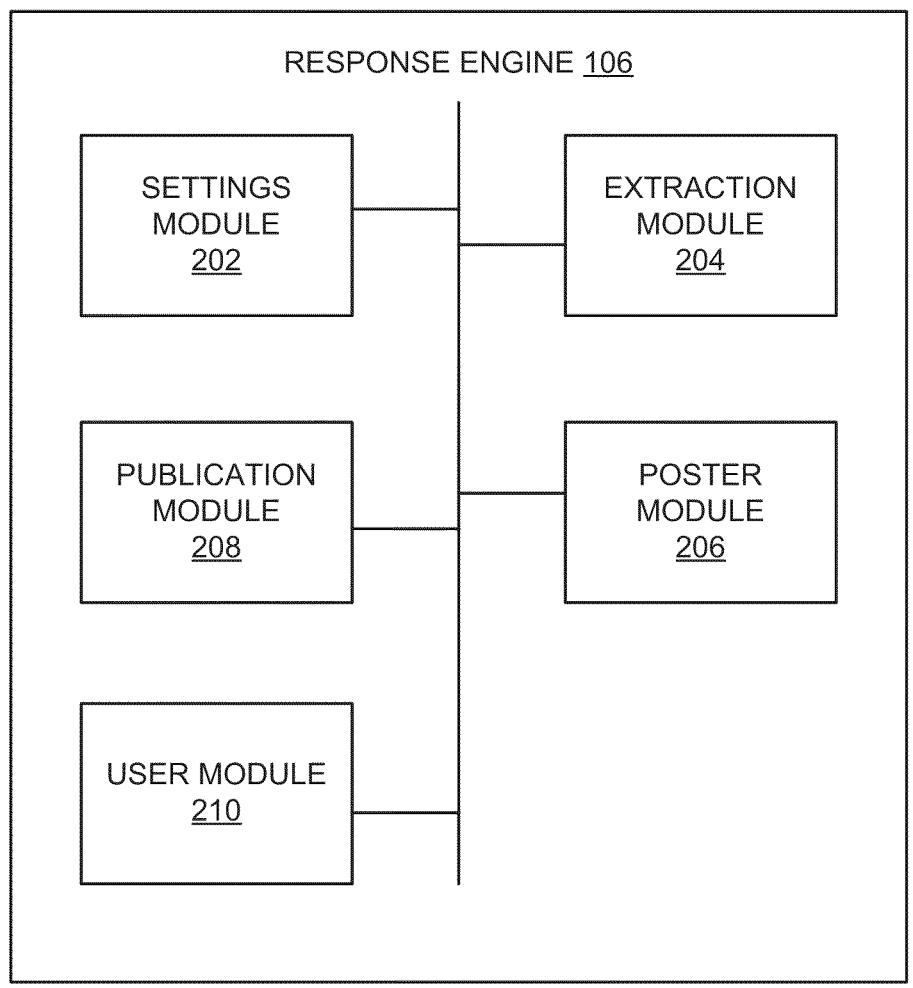
FIG. 2 is a block diagram of a response engine within the inquiry system, according to some embodiments.

FIG. 2 is a block diagram of a response engine 106 within the inquiry system, according to some embodiments. The response engine 106 may access or retrieve a stored response to an inquiry. In some embodiments, the response engine 106 may generate a response to an inquiry in response to a selection of a stored inquiry by a user. The response engine comprises a settings module 202, an extraction module 204, a poster module 206, a publication module 208, and a user module 210.

The optional settings module 202 is to receive and implement one or more settings from the poster. The settings include settings for displaying the stored inquiries to users, allowing users to contact the poster about the posting, and retrieving stored inquiries and stored responses from a source outside of the online publication system. In postings for an item for sale, an auction, or other transactions, the settings may include settings for various transaction states. For instance, before a transaction occurs (i.e., pre-transaction), the poster may desire that users may not be able to contact the poster directly. In these instances, the users may be able to view stored inquiries. However, after a transaction occurs (i.e., post-transaction), the poster may allow the user to contact him/her directly. An example user interface for receiving the settings from the poster is provided in FIG. 6.

The extraction module 204 is to extract at least a portion of a posting for inclusion in a stored response. For example, the extraction module 204 extracts a feature or property of an item for sale described in a posting. To illustrate, to answer a stored inquiry such as "What is the condition of the item?" the extraction module 204 may extract a property, "CONDITION='New'" from the posting. The stored response, "The condition of the item is <CONDITION>." may be rendered to the user as "The condition of the item is New." The extraction module 204 may extract the portion of the posting itself and/or from metadata related to the posting.

The poster module 206 is to access a set of inquiries and responses previously stored by the poster. The stored inquiries are associated with at least a portion of the postings submit by the poster. For example, a poster who posts descriptions of items for sale may store the inquiry, "Where did you find these items?" and the response, "All our collectibles are high quality antiques imported from all over the world, with most of our inventory from Thailand." that is associated with all or a portion of the postings submit by the poster.

The poster module 206 may store inquiries and responses in sets such that the poster may, for a new posting, indicate the sets to associate with the new posting. For example, if the above poster also posts party invitations in the online publication system, the poster may select another set of inquiries to be associated with those postings. For example, in the other set, the poster may include the inquiry: "Will transportation be available?" and the response: "Taxi transportation is available at the main entrance during the party."

The publication module 208 accesses stored inquiries that are answerable by the online publication system. The stored inquiries may include, for example, if a gift certificate issued by the online publication system can be used to purchase an item for sale described in a posting. The publication module 208 may retrieve responses stored previously. For other inquiries, the publication module 208 retrieves a response and incorporates other information retrieved from other sources into the retrieved response. The online publication system may also incorporate other information into a retrieved response such as shipping times, shipping rates, and information about a particular poster (e.g., reputation or rating), maps or directions to a location, or the like.

The user module 210 operates in conjunction with the extraction module 204, the poster module 206, and the publication module 208 to provide responses to the stored inquiries that are specific to the user. The user module 210 accesses user-specific data to generate a response specific to that user. The user-specific data may include geographic location, demographic data, payment account data, a history of past transactions, contact information, schedule, and the like.

The user module 210 may be particularly useful to answer inquiries after a transaction has occurred (e.g., after the user purchases an item for sale). For example, the user module 210 may access the user's geographic location to provide an answer to the inquiry: "When will I receive my purchased item?" To illustrate, to answer this inquiry, the user module 210 may operate in conjunction with the publication module 208. The publication module 208 may determine when the item was shipped to the user, and, based on the user's geographic location from the user module 210, calculate an estimated shipping time. The estimated shipping time may then be used to determine a projected delivery date that is incorporated into a retrieved response and provided to the user.

Figure 3:
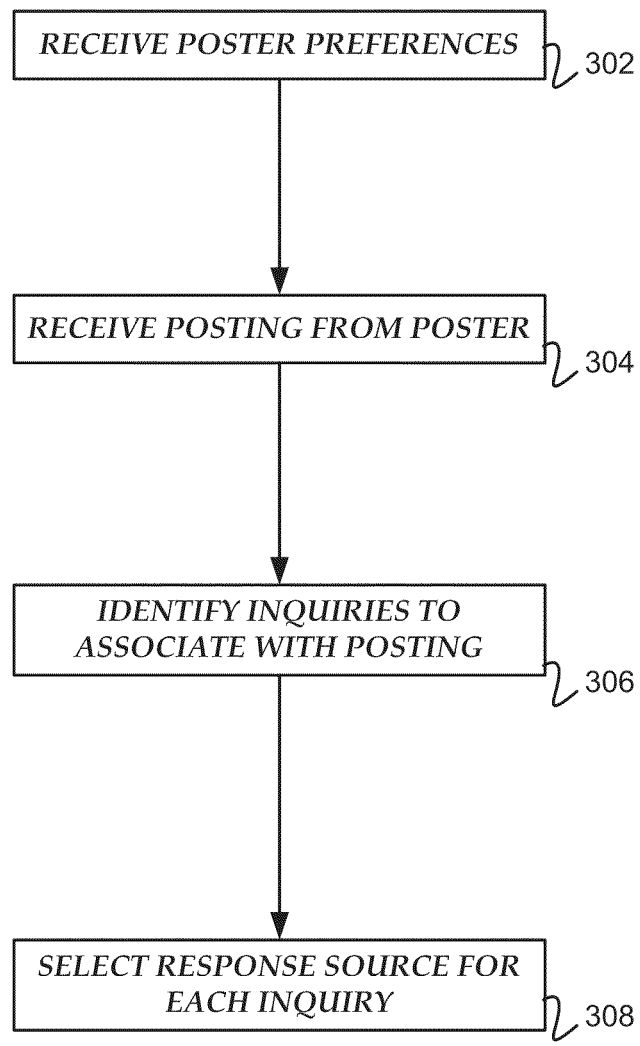
FIG. 3 is a flowchart of a process for associating inquiries with a particular posting, according to some embodiments.

FIG. 3 is a flowchart of a process 300 for associating inquiries with a particular posting according to some embodiments. The process 300 may be performed when a posting is submitted by a poster or while a posting is published in the online publication system.

In an operation 302, the preferences of the poster are received. The preferences may include the settings as described in connection with the settings module 202 of FIG. 2. The preferences may include one or more sets of stored inquiries to associate with a particular posting or a particular type of posting.

In an operation 304, the posting is received from the poster. In an operation 306, inquiries to associate with the posting are identified. The identification may be based, for example, on the type of the posting (e.g., event invitation, description of an item for sale, show times, auction announcement, etc.), the identity of the poster, and a state of a transaction associated with the posting.

In an operation 308, for each inquiry associated with a posting, a response source is identified. The response sources include the extraction module 204, the poster module 206, the publication module 208, and the user module 210, all of which are shown in FIG. 2.

Figure 4:
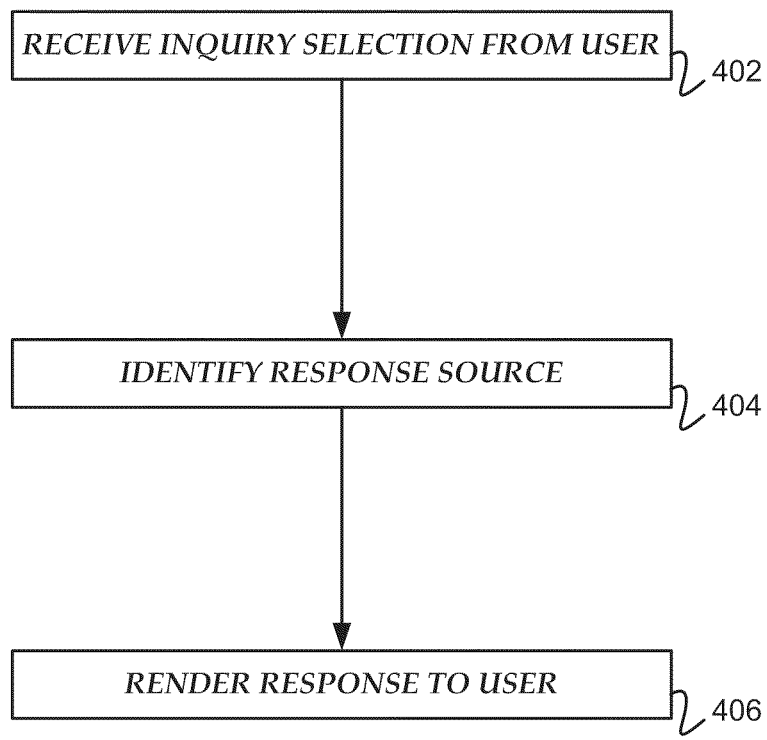
FIG. 4 is a flowchart of a process for providing a response to an inquiry, according to some embodiments.

FIG. 4 is a flowchart of a process 400 for providing a response to an inquiry, according to some embodiments. The process 400 is performed when a selection of a stored inquiry is received from a user in an operation 402. The user may be provided an interface that displays the stored inquiries and selects an inquiry to request a response. The interface is navigated to by the user from the posting or may form a part of the posting.

In an operation 404, the response source is identified. The identity of response source may be included in metadata or a tag associated with the inquiry. In some instances, the response source may be indicated by the inquiry engine 104 of FIG. 1.

In an operation 406, the response is rendered to the user. The response may be retrieved by the extraction module 204, the poster module 206, and the publication module 208, all of FIG. 2. In some instances, user-specific information may be incorporated into the retrieved responses using the user module 210 of FIG. 2.

Figure 5:
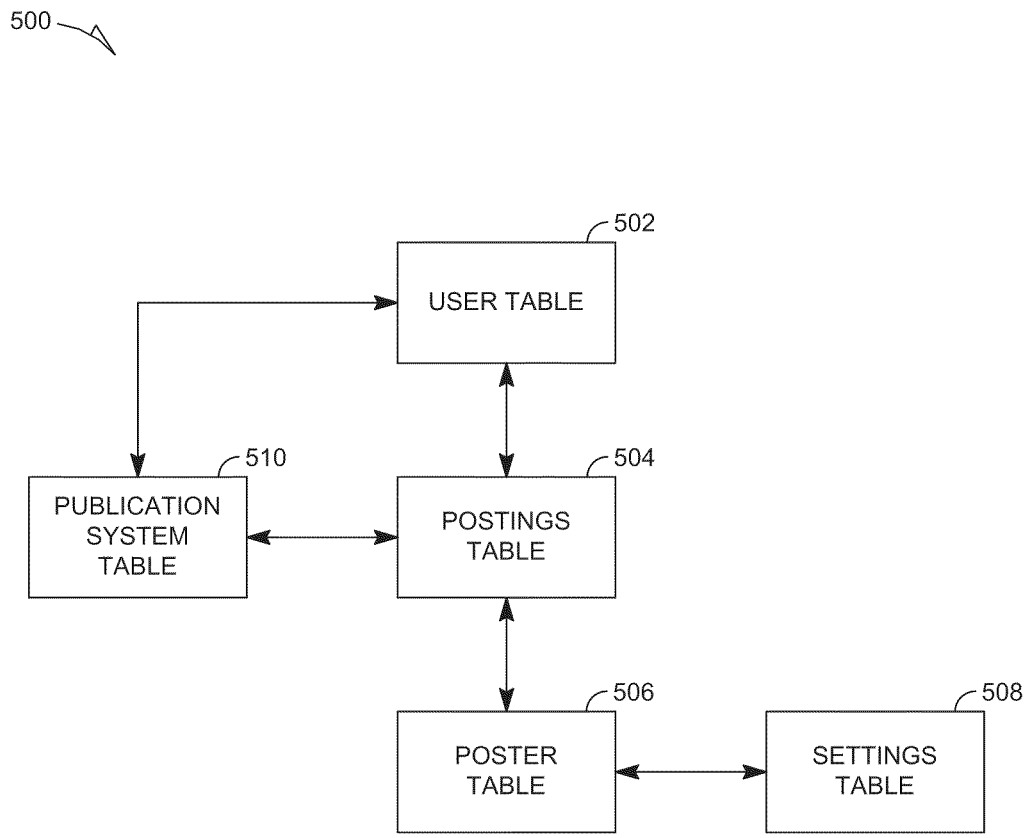
FIG. 5 is a high level entity-relationship diagram for storing inquiries and responses corresponding to the inquiries.

FIG. 5 is a high level entity-relationship diagram 500 for storing inquiries and responses corresponding to the inquiries. A user table 502 contains a record for each registered user of the online publication system, and may include identifier, address and financial instrument information pertaining to each such registered user. A user may operate as a poster within the online publication system.

The tables also include a postings table 504 in which are maintained posting records for postings that are published to users via the online publication system. Each posting record within the posting table 504 may furthermore be linked to one or more user records within the user table 502, so as to associate a poster and one or more users who view the posting with each posting record.

A poster table 506 contains a record for each poster who has submitted one or more postings. The posters in the poster table 506 may be each associated with a record pertaining to stored inquiries and stored responses submitted by the respective poster. A settings table 508 includes a record associated with a respective poster that stores the settings of the poster for responding to inquiries. A publication system table 510 is to store records of stored inquiries and stored responses that relate to the online publication system.

FIG. 6 is a depiction of an example settings interface 600 for receiving a setting from a poster. The settings interface 600 may be provided to the poster by the settings module 202 of FIG. 2. The settings interface 600 allows a poster to provide preferences for how a user can contact the poster and whether the user can view stored inquiries and retrieved responses (i.e., "Q&A"). The settings interface 600 comprises one or more options respectively selectable via an adjacent radio button. The options shown in the interface 600 include: "show Q&A and allow users to contact you directly," "show Q&A only," "don't show Q&A and allow users to contact you," and "show Q&A from a third party database." If an option where the Q&A is shown is selected by the poster, the users will be able to view stored inquiries and retrieved responses. If an option where the user is allowed to contact the poster directly is selected, the user is provided an interface for submitting an inquiry to the poster. The poster, in turn, is provided an interface to submit a response to the submitted inquiry.

In instances where the posting is transaction related, the settings interface may be modified to adjust the settings for each phase of the transaction. To illustrate, if the posting is a description of an item for sale, the poster may be allowed to select a first setting (e.g., "show Q&A only") before the transaction, to select a second setting during a transaction (e.g., while awaiting payment), and to select a third setting (e.g., "show Q&A and allow users to contact you") after the transaction is completed.

The fourth option, "show Q&A from a third party database," may be selected by the poster if the poster has previously stored inquiries and responses to inquiries in a database maintained by a third party separate from the online publication system. The online publication system may access the third party database or direct a user to the third party database to show the Q&A to the user.

FIGS. 7-13 depict example user interfaces provided by the inquiry system 100 of FIG. 1. The interfaces depicted are specific to postings that describe items for sale or auction provided by sellers and viewable by buyers or bidders.

FIG. 7 is a depiction of an example interface 700 to educate a poster to learn about the inquiry system. The example interface 700 depicts an example of a stored inquiry, "is international shipping offered?" and a retrieved response. In the instance shown in FIG. 7, the retrieved response ("Yes the seller offers international shipping. The seller ships to the following countries: US, Canada, Mexico") is based on the posting and retrieved using the extraction module 204 of FIG. 2.

In FIG. 7, the stored inquiries are grouped by topic. The example topics include: item details, shipping, payment, returns, and other. The topics may include stored inquiries. It is noted that a particular topic may include stored inquiries associated with various response sources. For example, the topic "payment" may include a first stored inquiry having a first retrieved response from the extraction module 204 of FIG. 2, a second stored inquiry having a second retrieved response from the poster module 206 of FIG. 2, and a third stored inquiry having a third retrieved response from the publication module 208 of FIG. 2.

Figure 8:
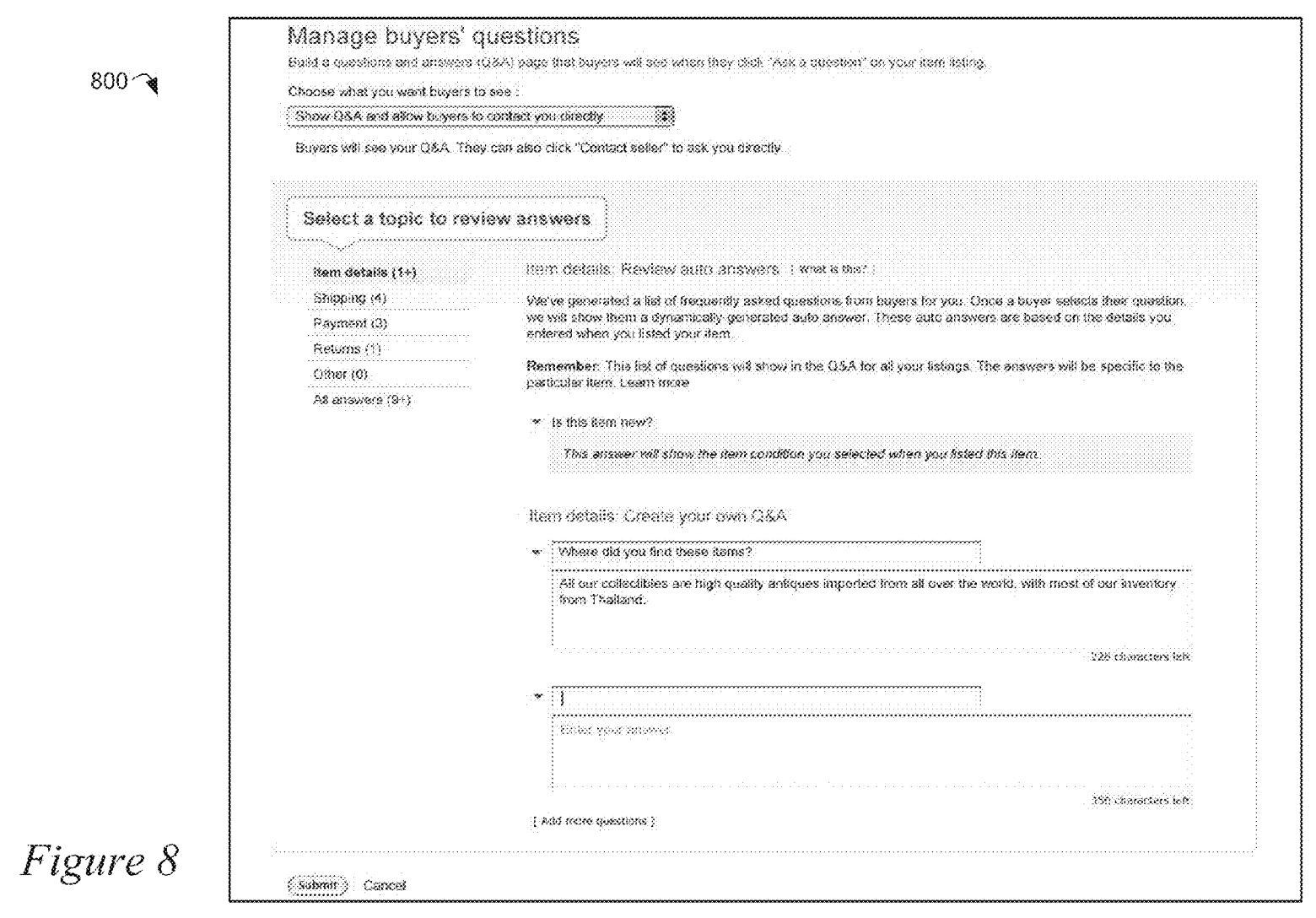

FIG. 8 is a depiction of an example interface 800 for receiving one or more stored inquiries from a poster. It may be desirable for the poster to provide one or more stored inquiries and retrieved responses that correspond to one or more of the postings submit by the poster. These provided inquiries may be questions that the poster has frequently received from users. In the shown interface 800, the poster is allowed to provide an inquiry to be stored and a response retrievable to answer the inquiry. The provided inquiries and responses may be stored by the extraction module 204 and the poster module 206, both of FIG. 2, respectively.

FIG. 9 is a depiction of an example interface 900 displaying stored inquiries and a response source for each stored inquiry. The example interface 900 more particularly depicts a set of inquiries where the first inquiry is answerable using a retrieved response from the extraction module 204 of FIG. 2 and where the second and third inquiries are answerable using retrieved responses from the publication module 208 of FIG. 2. It is understood that additional inquiries may be included that are answerable by retrieved responses from the poster module 206 of FIG. 2. Further, the retrieved responses may incorporate information from the user module 210 of FIG. 2.

FIG. 10 is a depiction of an example interface 1000 for responding to an inquiry received from a user. If the poster has provided a setting to allow the user to contact the poster directly, an interface (not shown) may be provided in response to an indication received from the user that the user would like to contact the poster directly. The interface 1000 is provided to the poster for responding to the received inquiry. As depicted, the interface 1000 may include an option to post the inquiry (e.g., question) and the poster's response so that other users may see the inquiry and response. To display the inquiry and response to other users, the inquiry may be added to the inquiry engine 104 of FIG. 1 and the response may be added to the poster module 206 of FIG. 2.

Figure 11:
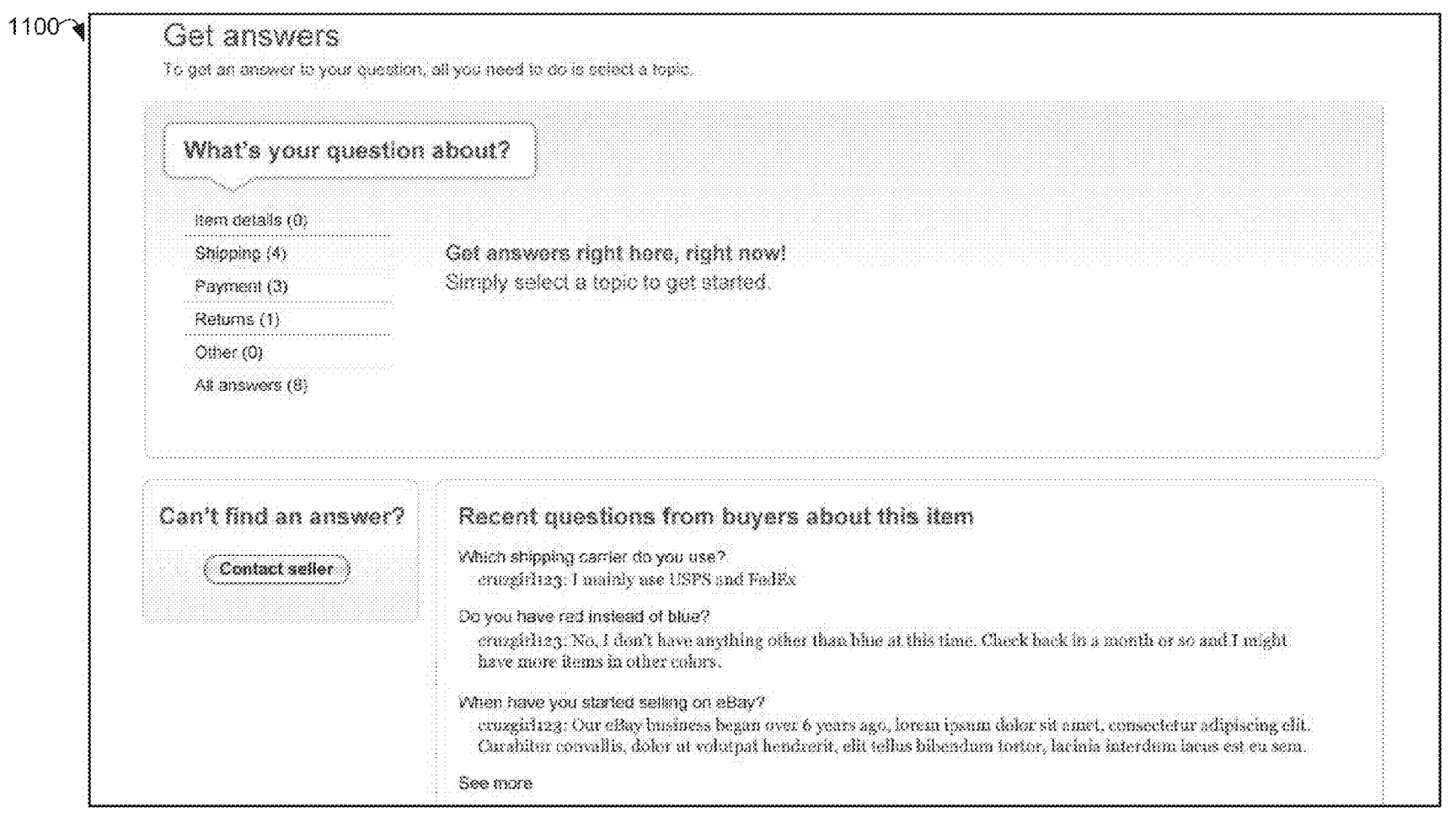
Figure 12:
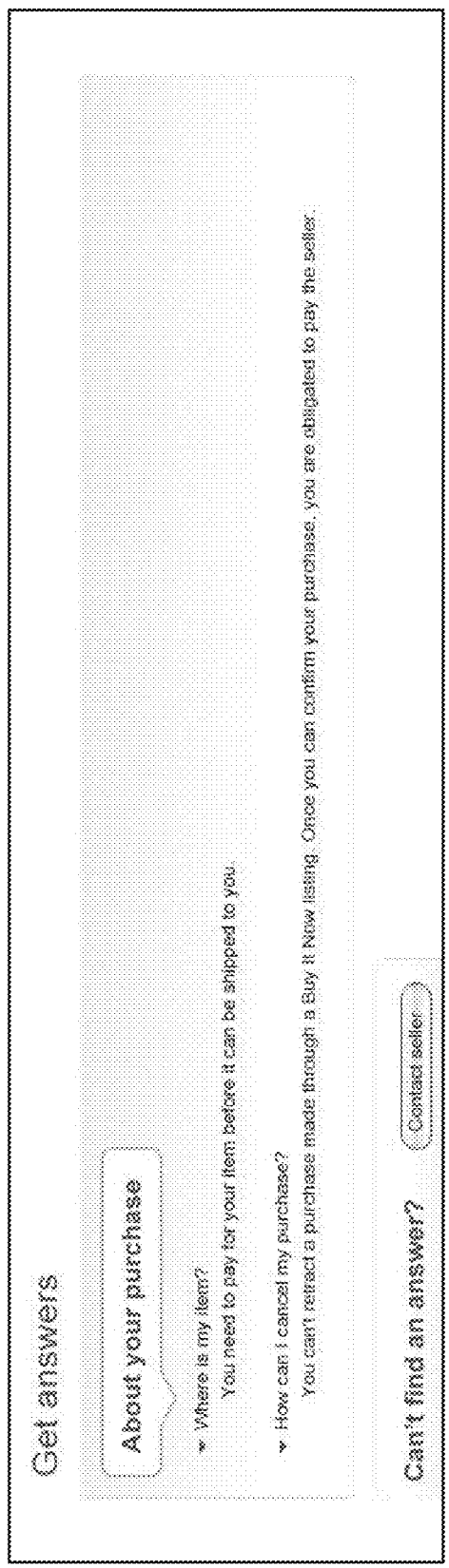
FIG. 12 is a depiction of an example interface displayed to a user to view stored inquiries and responses to the stored inquiries during a transaction.
Figure 13:
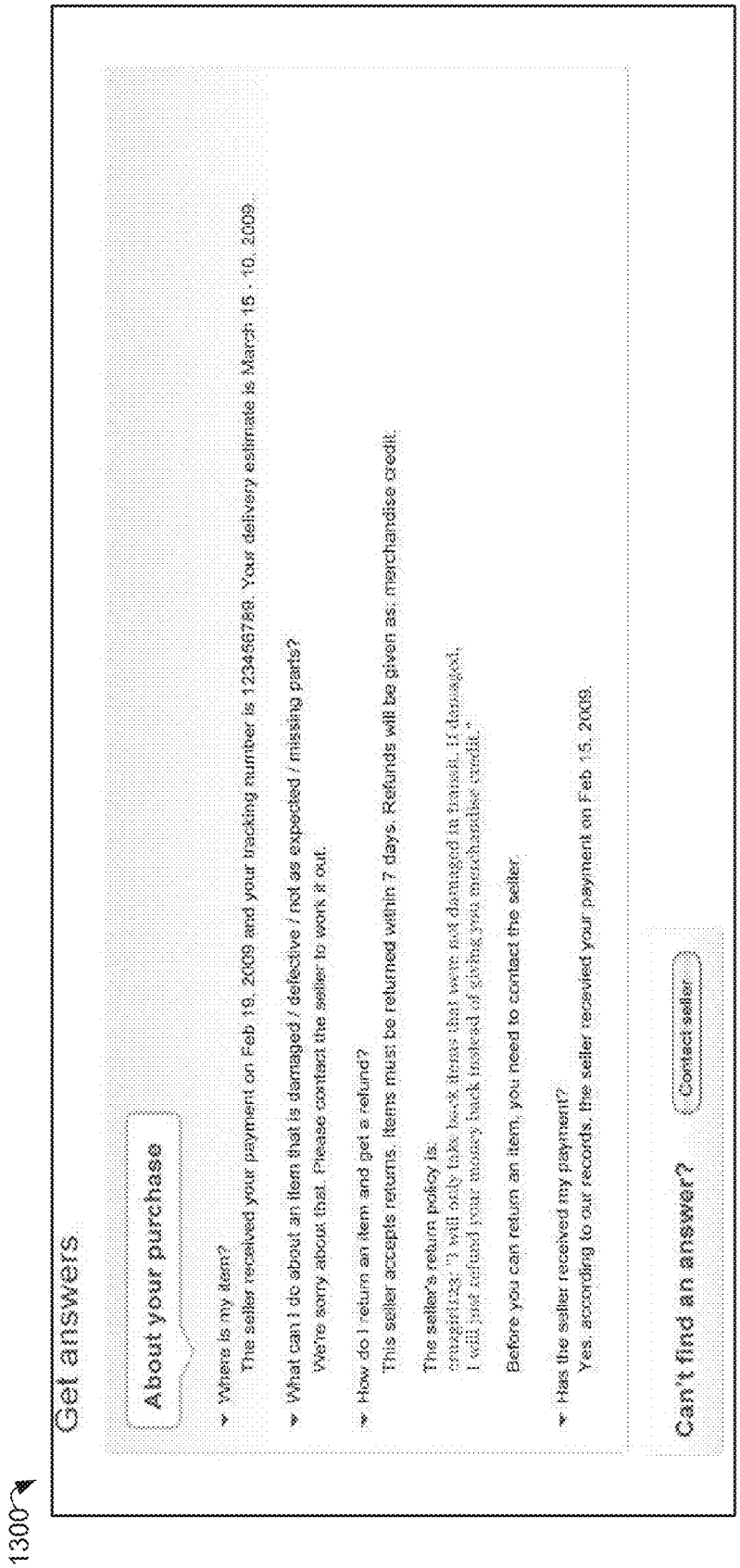
FIG. 13 is a depiction of an example interface displayed to a user to view stored inquiries and responses to the stored inquiries after a transaction.

FIGS. 11-13 depict interfaces provided to a user for viewing the Q&A before, during, and after a transaction, respectively. The user may be provided different sets of questions at each state of the transaction. Further, at some points, the user may not have the option to contact the poster or may not be able to view stored inquiries.

FIG. 11 is a depiction of an example interface 1100 displayed to a user to view stored inquiries and responses to the stored inquiries before a transaction. The user may be provided a list of topics for the inquiries, a list of inquiries received from other buyers, and an option to contact the poster directly. In other instances, for example, if there are less than five stored inquiries, the stored inquiries may simply be listed and not divided by topic. If the poster has not allowed users to contact the poster directly, the option to contact the poster may not appear or may be disabled by the online publication system.

FIG. 12 is a depiction of an example interface 1200 displayed to a user to view stored inquiries and responses to the stored inquiries during a transaction. In some instances, the stored inquiries available to the user may be limited to those questions that are relevant to the current transaction in progress. The example interface may include an option to contact the seller depending on the settings received from the seller or the online publication system.

FIG. 13 is a depiction of an example interface 1300 displayed to a user to view stored inquiries and responses to the stored inquiries after a transaction. The example interface 1300 may include questions relevant to the present transaction. The retrieved responses may incorporate information from the user module 210 of FIG. 2 such as package tracking information, payment history, and the like. The user may be able to contact the seller after a transaction is complete.

Figure 14:
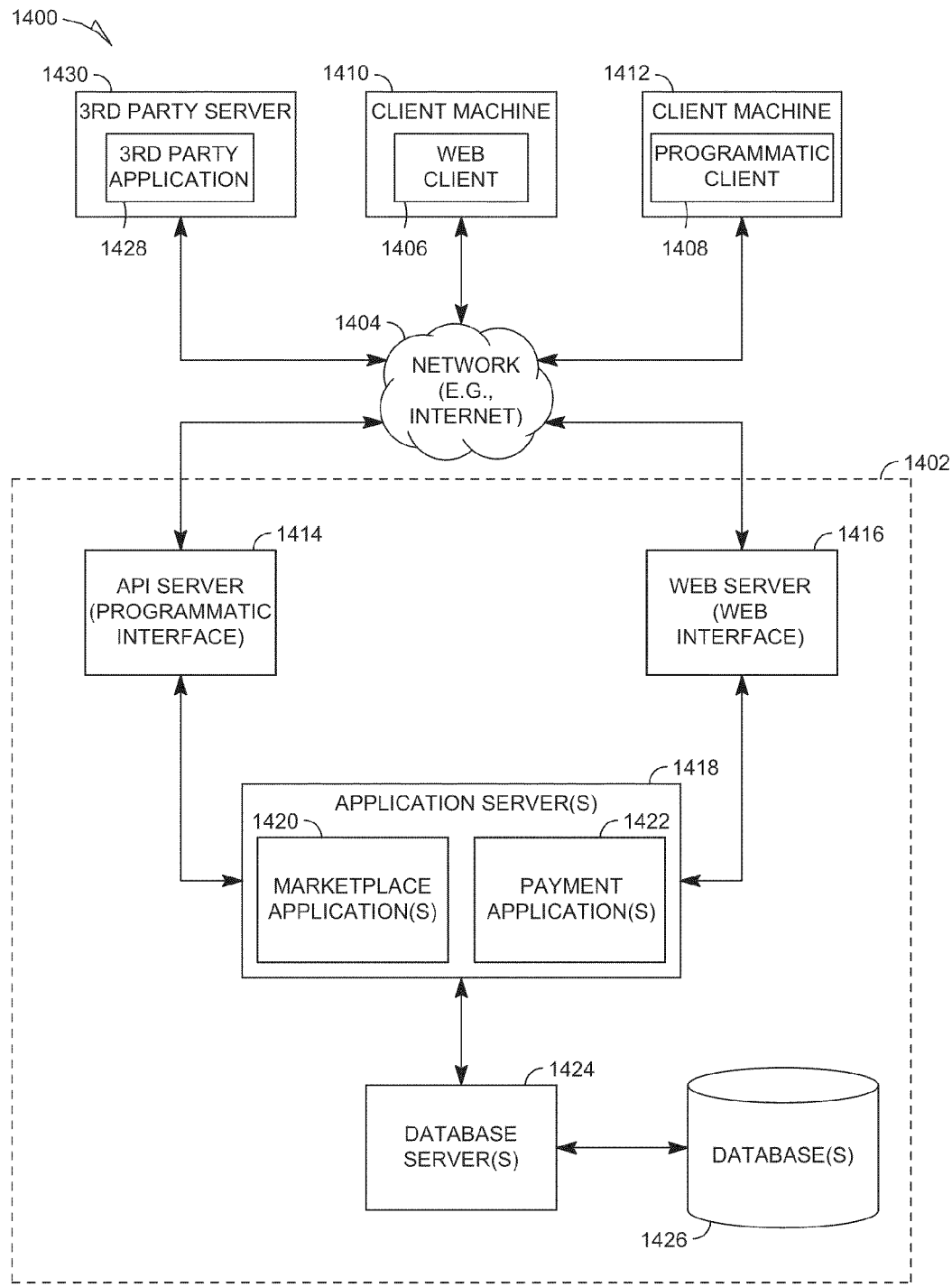
FIG. 14 is a network diagram depicting a client-server system within which one example embodiment may be deployed.

FIG. 14 is a network diagram depicting a client-server system 1400, within which one example embodiment may be deployed. A networked system 1402, in the example forms of a network-based marketplace or publication system, provides server-side functionality, via a network 1404 (e.g., the Internet or Wide Area Network (WAN)) to one or more clients. FIG. 14 illustrates, for example, a web client 1406 (e.g., a browser, such as the Internet Explorer browser developed by Microsoft Corporation of Redmond, Wash.), and a programmatic client 1408 executing on respective client machines 1410 and 1412.

An Application Program Interface (API) server 1414 and a web server 1416 are coupled to, and provide programmatic and web interfaces respectively to, one or more application servers 1418. The application servers 1418 host one or more marketplace applications 1420 and payment applications 1422. The inquiry system 100 of FIG. 1 may be included in the application server 1418 as part of the marketplace applications 1420 and/or the payment application 1422. The application servers 1418 are, in turn, shown to be coupled to one or more databases servers 1424 that facilitate access to one or more databases 1426.

The marketplace applications 1420 may provide a number of marketplace functions and services to users that access the networked system 1402. The payment applications 1422 may likewise provide a number of payment services and functions to users. The payment applications 1422 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1420. While the marketplace and payment applications 1420 and 1422 are shown in FIG. 14 to both form part of the networked system 1402, it will be appreciated that, in alternative embodiments, the payment applications 1422 may form part of a payment service that is separate and distinct from the networked system 1402.

Further, while the system 1400 shown in FIG. 14 employs a client-server architecture, the present invention is, of course, not limited to such an architecture, and could equally well find application in a distributed, or peer-to-peer, architecture system, for example. The various marketplace and payment applications 1420 and 1422 could also be implemented as standalone software programs, which do not necessarily have networking capabilities.

The web client 1406 accesses the various marketplace and payment applications 1420 and 1422 via the web interface supported by the web server 1416. Similarly, the programmatic client 1408 accesses the various services and functions provided by the marketplace and payment applications 1420 and 1422 via the programmatic interface provided by the API server 1414. The programmatic client 1408 may, for example, be a seller application (e.g., the TurboLister application developed by eBay Inc., of San Jose, Calif.) to enable sellers to author and manage postings on the networked system 1402 in an off-line manner, and to perform batch-mode communications between the programmatic client 1408 and the networked system 1402.

FIG. 14 also illustrates a third party application 1428, executing on a third party server machine 1430, as having programmatic access to the networked system 1402 via the programmatic interface provided by the API server 1414. For example, the third party application 1428 may, utilizing information retrieved from the networked system 1402, support one or more features or functions on a website hosted by the third party. The third party website may, for example, provide one or more promotional, marketplace or payment functions that are supported by the relevant applications of the networked system 1402.

Figure 15:
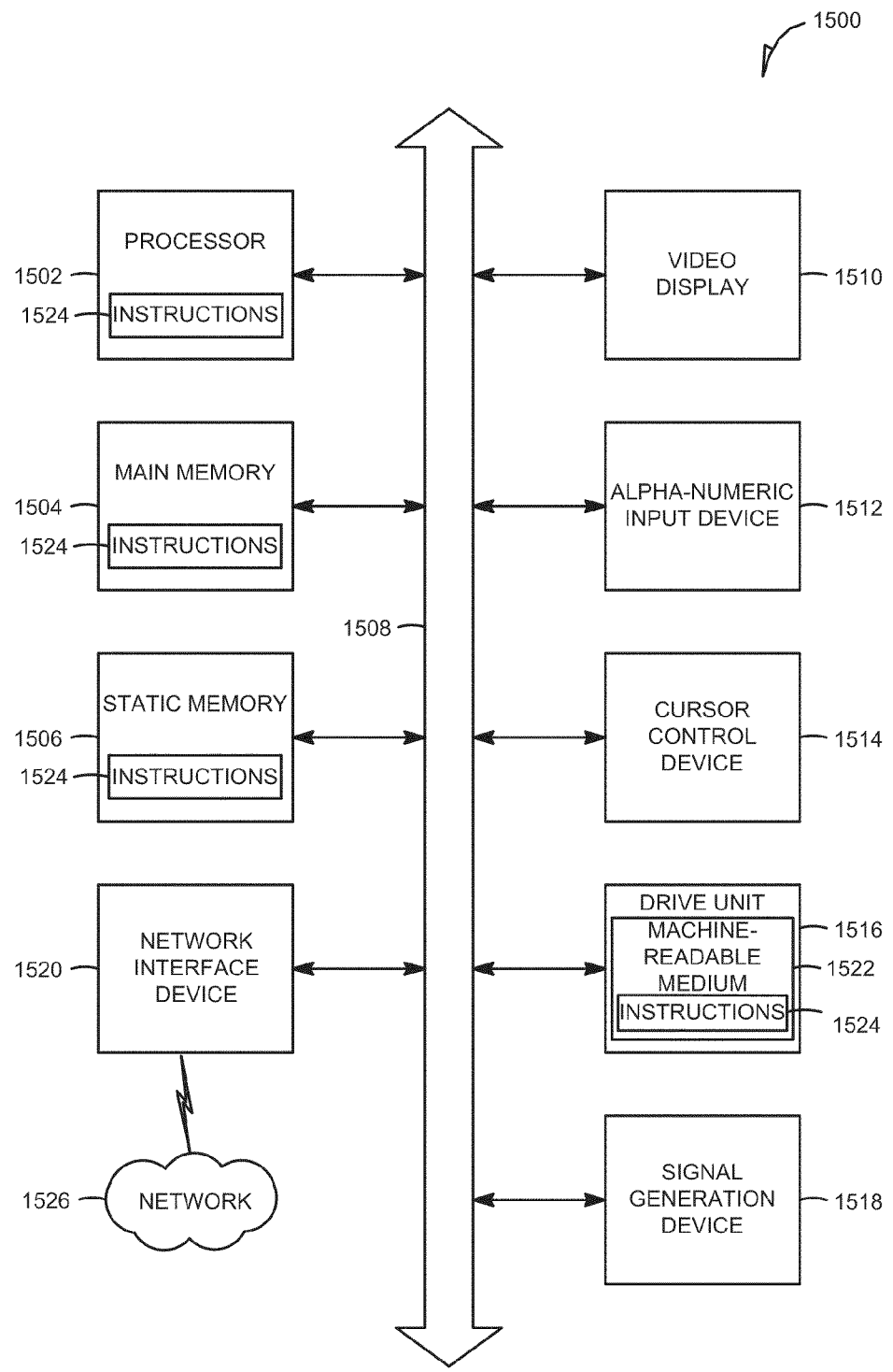
FIG. 15 is a diagrammatic representation of machine in the example form of a computer system within which a set of instructions, for causing the machine to perform any one or more of the methodologies discussed herein, may be executed.

FIG. 15 shows a diagrammatic representation of a machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide information from multiple sources have been described. The method and system described herein may be desirable in solving problems related to providing efficient and responsive customer services and to technical problems such as, but not limited to, reducing network traffic, maintaining databases, and reducing redundancy. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
  a memory that stores instructions; and
  one or more processors configured by the instructions to perform operations comprising:
    receiving, from a first user, a selection of a question to include in postings by the first user for items in an online publication system;
    receiving, after the selection of the question, data for an item, the data submitted by the first user;
    generating a posting for the item in the online publication system based on the data and the selected question;
    receiving, via a network, an inquiry submitted by a second user;
    selectively retrieving, in response to the inquiry submitted by the second user, a response comprising an answer to the selected question, the answer comprising at least a portion of the data submitted by the first user; and
    providing a user interface depicting the selected question and the retrieved response.

2. The system of claim 1, wherein the operations further comprise receiving contact settings from the first user.

3. The system of claim 2, wherein the contact settings comprise a first contact option for a first transaction state of the item and a second contact option for a second transaction state of the item.

4. The system of claim 1, wherein the inquiry submitted by the second user is submitted post-purchase of the item by the second user.

5. A method comprising:
  receiving, from a first user, a selection of a question to include in postings by the first user for items in an online publication system;
  receiving, after the selection of the question, data for an item, the data submitted by the first user;
  generating a posting for the item in the online publication system based on the data and the selected question;
  receiving, via a network, an inquiry submitted by a second user;
  selectively retrieving, using one or more processors and in response to the inquiry received from the second user, a response comprising an answer to the selected question, the answer comprising at least a portion of the data submitted by the first user; and
  providing a user interface depicting the selected question and the retrieved response.

6. The method of claim 5, further comprising receiving contact settings from the first user.

7. The method of claim 6, wherein the contact settings comprise a first contact option for a first transaction state of the item and a second contact option for a second transaction state of the item.

8. The method of claim 5, wherein the retrieved response is generated post-purchase of the item.

9. A non-transitory computer-readable storage medium having instructions embodied thereon, the instructions executable by one or more processors for performing operations comprising:
  receiving, from a first user, a selection of a question to include in postings by the first user for items in an online publication system;
  receiving, after the selection of the question, data for an item, the data submitted by the first user;
  generating a posting for the item in the online publication system based on the data and the selected question;
  receiving, via a network, an inquiry submitted by a second user;
  selectively retrieving, in response to the inquiry received from the second user, a response comprising an answer to the selected question, the answer comprising at least a portion of the data submitted by the first user; and providing a user interface depicting the selected question and the retrieved response.

10. The system of claim 3, wherein:

the first contact option for the first transaction state of the item does not allow the second user to contact the first user directly; and the second contact option for the second transaction state of the item allows the second user to contact the first user directly.

11. The system of claim 10, wherein:

the first transaction state is pre-transaction; and the second transaction state is post-transaction.

12. The method of claim 7, wherein:

the first contact option for the first transaction state of the item does not allow the second user to contact the first user directly; and the second contact option for the second transaction state of the item allows the second user to contact the first user directly.

13. The non-transitory computer-readable storage medium of claim 9, wherein the operations further comprise receiving contact settings from the first user.

14. The non-transitory computer-readable storage medium of claim 13, wherein the contact settings comprise a first contact option for a first transaction state of the item and a second contact option for a second transaction state of the item.

15. The non-transitory computer-readable storage medium of claim 14, wherein:

the first contact option for the first transaction state of the item does not allow the second user to contact the first user directly; and the second contact option for the second transaction state of the item allows the second user to contact the first user directly.

* * * * *